(12) United States Patent
Lindau

(10) Patent No.: US 8,277,545 B2
(45) Date of Patent: Oct. 2, 2012

(54) METHOD OF REDUCING AN AMOUNT OF MERCURY IN A FLUE GAS

(75) Inventor: Leif A. V. Lindau, Arlov (SE)

(73) Assignee: ALSTOM Technology Ltd, Baden (CH)

( * ) Notice: Subject to any disclaimer, the term of this patent is extended or adjusted under 35 U.S.C. 154(b) by 314 days.

(21) Appl. No.: 12/821,630

(22) Filed: Jun. 23, 2010

(65) Prior Publication Data
US 2010/0258006 A1    Oct. 14, 2010

Related U.S. Application Data

(62) Division of application No. 11/962,500, filed on Dec. 21, 2007, now Pat. No. 7,766,997.

(51) Int. Cl.
B01D 53/64    (2006.01)
B01D 53/06    (2006.01)

(52) U.S. Cl. ............. 96/134; 96/150; 423/210; 423/230

(58) Field of Classification Search .................... 95/107, 95/108, 135, 137, 134; 96/134, 150; 423/210, 423/230, 244.01; 110/345, 216
See application file for complete search history.

(56) References Cited

U.S. PATENT DOCUMENTS

| | | | |
|---|---|---|---|
| 3,961,020 A | 6/1976 | Seki | |
| 4,502,872 A | 3/1985 | Ivester et al. | |
| 4,645,653 A | 2/1987 | Kimura | |
| 4,889,698 A | 12/1989 | Moller et al. | |
| 5,100,643 A | 3/1992 | Brna et al. | |
| 5,112,588 A | 5/1992 | Staudinger et al. | |
| 5,435,980 A | 7/1995 | Felsvang et al. | |
| 5,505,766 A | 4/1996 | Chang | |
| 5,527,496 A | 6/1996 | Rogers et al. | |
| 5,556,447 A | 9/1996 | Srinivasachar et al. | |
| 5,569,436 A | 10/1996 | Lerner | |
| 5,672,323 A | 9/1997 | Bhat et al. | |
| 5,854,173 A | 12/1998 | Chang et al. | |
| 6,027,551 A | 2/2000 | Hwang et al. | |
| 6,033,639 A * | 3/2000 | Odenmo | 423/210 |

(Continued)

FOREIGN PATENT DOCUMENTS

DE    102004044291    3/2006

(Continued)

OTHER PUBLICATIONS

PCT International Search Report and the Written Opinion of the International Searching Authority dated Oct. 6, 2009—(PCT/IB2008/003570).

(Continued)

*Primary Examiner* — Frank Lawrence, Jr.
(74) *Attorney, Agent, or Firm* — Rita D. Vacca

(57) ABSTRACT

The subject matter disclosed herein relates to a method of reducing an amount of mercury discharged to an environment in a flue gas (12) generated by combustion of a fuel source. The method includes contacting the flue gas with a moist pulverous material upstream of a particle separator (24), mixing powdered activated carbon (PAC) in an amount between about 0.5 lb/MMacf and 10 lbs/MMacf with the flue gas (12) upstream of the particle separator (24), wherein the PAC interacts with at least a portion of mercury containing compounds in the flue gas (12), and separating the mercury containing compounds from the flue gas (12) containing the moist pulverous material and PAC, thereby reducing an amount of mercury in the flue gas (12).

7 Claims, 5 Drawing Sheets

U.S. PATENT DOCUMENTS

| | | | |
|---|---|---|---|
| 6,322,613 | B1 | 11/2001 | Wojtowicz et al. |
| 6,451,094 | B1 | 9/2002 | Chang et al. |
| 6,521,021 | B1 | 2/2003 | Pennline et al. |
| 6,558,454 | B1 | 5/2003 | Chang et al. |
| 6,719,828 | B1 | 4/2004 | Lovell et al. |
| 6,818,043 | B1 | 11/2004 | Chang et al. |
| 6,848,374 | B2 | 2/2005 | Srinivasachar et al. |
| 6,878,358 | B2 | 4/2005 | Vosteen et al. |
| 6,953,494 | B2 | 10/2005 | Nelson, Jr. |
| 7,033,548 | B2 | 4/2006 | Pahlman et al. |
| 7,153,481 | B2 | 12/2006 | Bengtsson et al. |
| 7,361,209 | B1 | 4/2008 | Durham et al. |
| 2002/0150516 | A1 | 10/2002 | Pahlman et al. |
| 2003/0103882 | A1 | 6/2003 | Biermann et al. |
| 2003/0206843 | A1 | 11/2003 | Nelson, Jr. |
| 2004/0003716 | A1 | 1/2004 | Nelson, Jr. |
| 2004/0086439 | A1 | 5/2004 | Vosteen et al. |
| 2007/0051239 | A1 | 3/2007 | Holmes et al. |
| 2007/0180990 | A1 | 8/2007 | Downs et al. |

FOREIGN PATENT DOCUMENTS

| | | |
|---|---|---|
| EP | 0 253 563 | 1/1988 |
| EP | 1 275 430 | 1/2003 |
| EP | 1 645 323 | 4/2006 |
| EP | 1815903 | 8/2007 |
| WO | 93/08902 | 5/1993 |
| WO | WO 03/093518 | 10/1993 |
| WO | 96/16722 | 6/1996 |
| WO | 97/22400 | 6/1997 |
| WO | 97/37747 | 10/1997 |
| WO | 98/43729 | 10/1998 |
| WO | 99/59704 | 11/1999 |
| WO | WO 93/20926 | 11/2003 |
| WO | 2004/108254 | 12/2004 |

OTHER PUBLICATIONS

Lorentz Rivelius: "High Performance DFGD" Worldwide Pollution Control Association [Online] Apr. 13, 2007, pp. 1-41.

Todd R. Carey: "Assessing Sorbet Injection Mercury Control. Effectiveness in Flue Gas Streams" Environmental Progress, New York, vol. 19, No. 3—Jan. 1, 2000 pp. 167-174.

*Clean Air Solutions for Waste Incineration*, published by Alstom Environmental Control Systems, 2005, printed from www.alstomenvironmental.com.

*Project Information—Jönköping Energi AB*, published by Alstom Power Sweden AB, 2005, printed from www.power.alstom.com.

*Alstom—Waste Incineration—NID Description*, published by Alstom Environmental, 2003, printed from www.alstompc.com/xq/asp/id.12/Page.314/qx/product.htm, on Nov. 6, 2007.

*Control of Mercury Emissions for Coal-Fired Electric Utility Boilers*, printed from www.epa.gov/ttn/atw/utility/hgwhitepaperfinal.pdf on Dec. 21, 2007, publication date unknown.

*Demonstration of Dry Carbon-Based Sorbent Injection for Mercury Contro lin Utility ESPs and Baghouses*, printed from www.netl.doe.gov/publications/proceedings/97/97ps/ps_df/ps2b-6.pdf on Dec. 21, 2007, publication date unknown.

John Tarabocchia, PE; Mercury Separation from Flue Gas and Scrub Water with Trimercapto-s-triazine (TMT) Control/Tracking Number: 03-A-15-AWMA (17 pages).

European Search Report—EP Application No. 05021227.3, dated Feb. 17, 2006.

* cited by examiner

METHOD OF REDUCING AN AMOUNT OF MERCURY IN A FLUE GAS

BACKGROUND (1) Field

The disclosed subject matter generally relates to reducing an amount of mercury discharged to an environment incident to the combustion of a fuel source containing mercury or mercury containing compounds, and more particularly to reducing an amount of mercury discharged in a combustion flue gas that is subjected to a flash dryer absorber (FDA) system.

(2) Description of the Related Art

Combustion of fuel sources such as coal produces a waste gas, referred to as "flue gas" that is to be emitted into an environment, such as the atmosphere. The fuel sources typically contain sulfur and sulfur compounds, which are converted in the combustion process to gaseous species, including sulfur oxides, which then exist as such (otherwise known as "acid gases") in the resulting flue gas. The fuel sources typically also contain elemental mercury or mercury compounds, which are converted in the combustion process to, and exist in the flue gas as, gaseous elemental mercury or gaseous ionic mercury species (generally referred to hereinafter as "mercury containing compounds").

Accordingly, flue gas contains dust, fly ash, and noxious substances such as acid gases, as well as other impurities, that are considered to be environmental contaminants. Prior to being emitted into the atmosphere via a smoke stack ("stack"), the flue gas undergoes a cleansing or purification process.

In coal combustion, flue gas often undergoes a desulfurization process, which typically occurs in a flue gas desulfurization system. There are several types of desulfurization systems, including wet flue gas desulfurization (WFGD), also known as "wet scrubbers" and dry flue gas desulfurization (DFGD), also known as "dry scrubbers." There are two separate types of DFGD, the first is a spray dryer absorber (SDA), while the other is a flash dryer absorber (FDA).

Acid gases are removed from flue gas using a FDA system by chemically reacting a moist pulverous material with the acid gases contained within the flue gas. Generally, the acid gases are absorbed by the moist pulverous material, which is then separated from the flue gas by the particle separator. The moist pulverous material typically includes 0.5-5 wt. % water based on the total weight of the moist pulverous material and a basic reagent that will interact with contaminants to remove them from the flue gas. Examples of basic reagents that are useful in the moist pulverous material include, but are not limited to, particulate material collected from the flue gas (such as dust and fly ash), as well as alkaline material, which generally can be selected from lime, limestone, calcium hydroxide and the like and combinations thereof.

Recently, there has been an increased focus on the removal of mercury. Presently, there are various methods for removing mercury from flue gas emissions. Those methods include, but are not limited to the following: addition of oxidizing agents in a boiler upstream of the flue gas emission control system and then removing it with wet scrubbers; addition of reactants to bind mercury and remove it from the flue gas; and utilization of particular coal or fuel that minimizes the amount of mercury released when the coal or fuel is burned.

It has been shown that a number of generally known methods of mercury removal are effective to produce mercury salts, which can be dissolved and removed by the aqueous alkaline slurry used in a wet flue gas desulfurization system (WFGD). Some of these methods include the addition of halogen or halogen compounds, such as bromine, to the coal or to the flue gas upstream of the wet scrubbing operation, to provide oxidation of elemental mercury to ionic mercury and formation of mercury salts, which are then dissolved in the aqueous alkaline slurry incident to the sulfur oxide removal processes. However, the removal of mercury in a DFGD system has proven to be difficult to control and it is not easily predicted when designing a flue gas cleaning system with respect to mercury removal. The desired emission guarantee levels are often as low as 1 µg/Nm$^3$ of mercury, which corresponds to a very efficient mercury removal in the DFGD system.

SUMMARY

One aspect of the disclosed subject matter relates to a method of reducing an amount of mercury discharged to an environment in a flue gas generated by combustion of a fuel source. The method includes: contacting the flue gas with a moist pulverous material upstream of a particle separator, wherein the moist pulverous material facilitates the removal of acid gases from the flue gas; mixing powdered activated carbon (PAC) in an amount between about 0.5 lb/MMacf and 10 lbs/MMacf with the flue gas upstream of the particle separator, wherein the PAC interacts with at least a portion of mercury containing compounds in the flue gas; and separating the mercury containing compounds from the flue gas containing the moist pulverous material and PAC, thereby reducing an amount of mercury in the flue gas.

Another aspect of the disclosed subject matter relates to a system for reducing an amount of mercury discharged to an environment in a flue gas generated by combustion of a fuel source. The system includes: a mixer adapted to form a moist pulverous material effective to remove contaminants from the flue gas, wherein the mixer facilitates the introduction of the moist pulverous material to the flue gas; a particle separator downstream of the mixer; and means for introducing powdered activated carbon (PAC) to the flue gas upstream of the particle separator in an amount between about 0.5 lbs/MMacf and 10 lbs/MMacf to remove at least a portion of mercury containing compounds from the flue gas, thereby reducing an amount of mercury discharged to an environment.

Another aspect of the disclosed subject matter relates to a method of removing mercury from a flue gas generated by combustion of a fuel source. The method includes: forming a moist pulverous material comprising at least one alkaline material selected from lime, limestone, calcium hydroxide and combinations thereof; introducing the moist pulverous material to the flue gas upstream of a particle separator; introducing powdered activated carbon (PAC) to the flue gas to facilitate the removal of at least a portion of mercury containing compounds, wherein the PAC is mixed with the flue gas upstream of the particle separator in an amount between 0.5 lbs/MMacf and 10 lbs/MMacf; and separating at least a portion of the mercury containing compounds from the flue gas in the particle separator, thereby removing mercury from the flue gas.

Yet another aspect of the disclosed subject matter relates to a method of reducing an amount of mercury discharged to an environment in a flue gas generated by combustion of a fuel source. The method includes: contacting the flue gas with a moist pulverous material, wherein the moist pulverous material facilitates the removal of acid gases from the flue gas; mixing powdered activated carbon (PAC) in an amount between about 0.5 lb/MMacf and 10 lbs/MMacf with the flue gas, wherein the PAC interacts with at least a portion of mercury containing compounds in the flue gas; and separating the mercury containing compounds from the flue gas containing the moist pulverous material and PAC, thereby reducing an amount of mercury in the flue gas.

Another aspect of the disclosed subject matter relates to a system for reducing an amount of mercury discharged to an environment in a flue gas generated by combustion of a fuel source. The system includes: a contact module for contacting flue gas with a moist pulverous material, wherein said moist pulverous material facilitates the removal of acid gases from said flue gas; a PAC module for mixing powdered activated carbon (PAC) in an amount between about 0.5 lb/MMacf and 10 lbs/MMacf with said flue gas, wherein said PAC interacts with at least a portion of mercury containing compounds in said flue gas; and a separation module for separating said mercury containing compounds from said flue gas containing said moist pulverous material and PAC, thereby reducing an amount of mercury in said flue gas.

BRIEF DESCRIPTION OF THE DRAWINGS

For the purpose of illustrating the subject matter disclosed herein, the drawing shows a form of the embodiments that is presently preferred. However, it should be understood that the disclosed subject matter is not limited to the precise arrangements and instrumentalities shown in the drawing, wherein.

DETAILED DESCRIPTION

Figure 1:
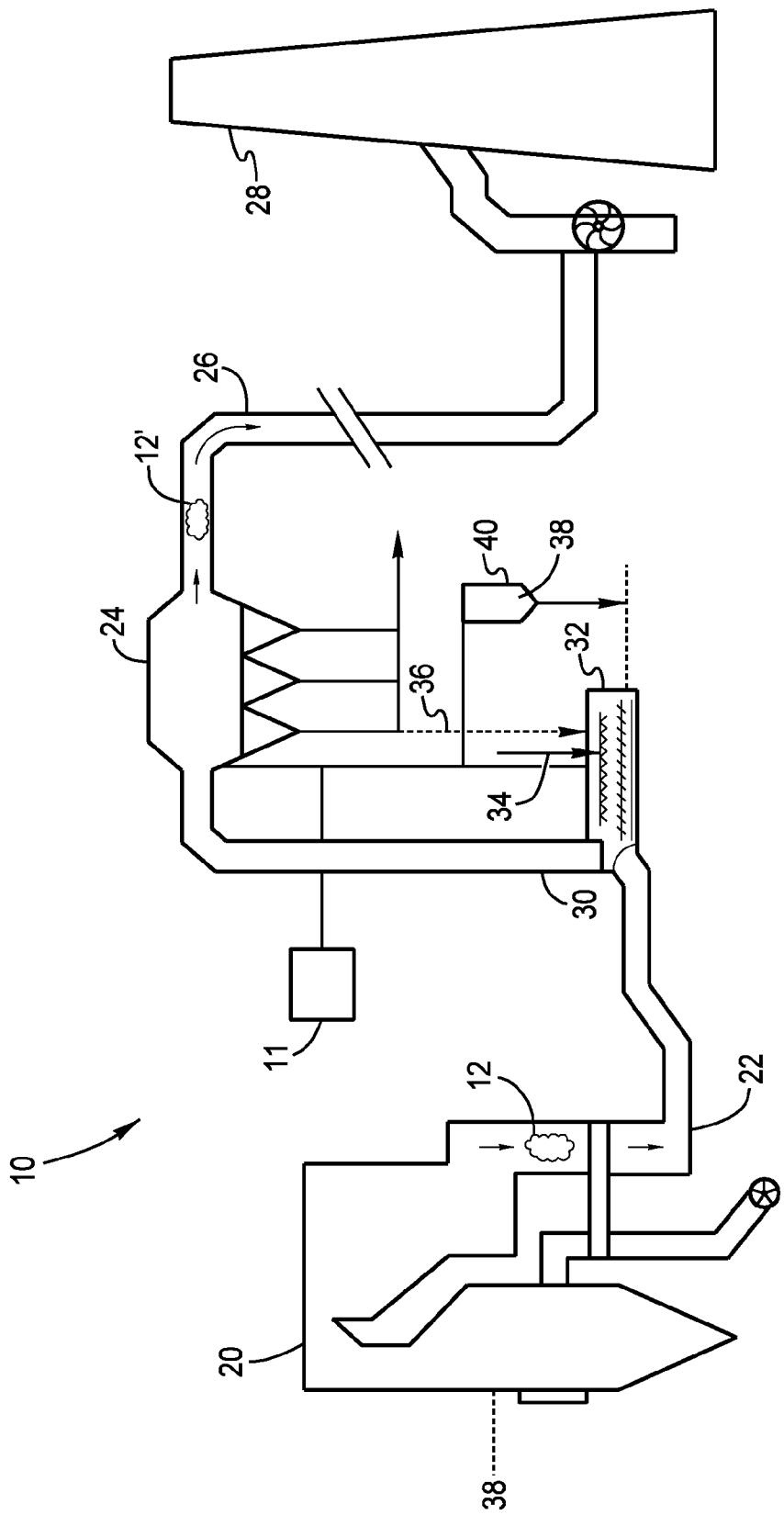
FIG. 1 is a schematic diagram of a system for reducing an amount of mercury emitted by a flue gas, which is practiced using a DFGD system.

Referring now to the drawings in which like reference numerals indicate like parts, and in particular to FIG. 1, one aspect of the disclosed subject matter is a system 10 for reducing an amount of gaseous elemental mercury emitted by a flue gas, which is practiced using a dry scrubbing operation. The components within system 10, which are described in more detail herein, are typically controlled by a controller 11. Controller 11 is configured in a manner to allow the addition of materials and the fluid communication between components of system 10.

In system 10, a flue gas 12 travels from a combustion source, such as a coal-fired boiler 20, through a duct 22 to various equipment designed to remove contaminants from the flue gas. In duct 22, flue gas 12 is typically at a temperature between about 120° C. and about 200° C.

In addition to particulate material such as dust and fly ash, as well as gaseous contaminants such as sulfur oxide, upon leaving boiler 20 flue gas 12 may contain mercury containing compounds and have a mercury concentration of about 5 µg/Nm3 to about 200 µg/Nm$^3$.

After traveling from boiler 20, flue gas 12 enters a particle separator 24, which separates and removes particulate material, including particulate material having contaminants, such as acid gas, absorbed thereon, from the flue gas. The term "particulate material" as used herein, includes, but is not limited to, dust, fly ash, as well as material having contaminants absorbed thereon. Particle separator 24 also facilitates the re-circulation of at least a portion of the particulate material into system 10.

In FIG. 1, particle separator 24 is shown as a fabric filter, which includes a plurality of rows of filter bags through which the flue gas passes and is cleaned. It is contemplated that other types of particle separators, such as an electrostatic precipitator, can be used in the presently described system.

The cleaned flue gas, i.e., flue gas 12', eventually exits particle separator 24 and is sent through a duct 26 to stack 28, where it is released to the atmosphere. Upon exiting particle separator 24, flue gas 12' typically is at a temperature between about 60° C. and about 90° C. and contains less than 0.03 g/Nm$^3$ of particles and has an acceptable concentration of sulfur oxides.

After passing through particle separator 24 and prior to its emission into the atmosphere, flue gas 12' may be subjected to other treatment processes or equipment to remove contaminants therefrom.

Duct 22 includes a vertical portion 30, through which flue gas 12 flows to reach particle separator 24. A mixer 32 is in fluid communication with vertical portion 30, which serves as an area or module where flue gas 12 can come into contact and react with contaminant-removing reagents that are prepared in the mixer. Mixer 32 can be any apparatus that facilitates the mixture of reagents to form a moist pulverous material and the introduction of the same into flue gas 12. One example of mixer 32 is the Alstom FDA system, manufactured by Alstom Power, Knoxville, Tenn.

Mixer 32 typically has a chamber to which various reagents and water are added. Mixer 32 may have a mechanical mixing mechanism (not shown) having agitators for combining the reagents and water.

Mixer 32 introduces the moist pulverous material into flue gas 12 in vertical portion 30. The moist pulverous material can be introduced to flue gas 12 by any means known in the art, including an injection mechanism, a chute, a valve, and the like. In addition to facilitating the removal of contaminants from flue gas 12, the moist pulverous material lowers the temperature of the flue gas to a temperature conducive to facilitate such a removal.

The moist pulverous material can be introduced to flue gas 12 in a continuous manner or can be introduced in an amount sufficient to absorb and remove contaminants therefrom. The particular amount of moist pulverous material added to flue gas 12 is determined by variables in each system, and such determination can be readily made by a system operator.

In some embodiments, as shown in FIG. 1, the moist pulverous material includes water and particulate material, and is formed by mixing water from a supply line 34 with a portion of particulate material (not shown) separated from flue gas 12 by particle separator 24 and transported from the particle separator to mixer 32 via a duct 36. The remaining particulate material from particle separator 24 not sent to mixer 32 can be used in various manners or discarded. The moist pulverous material typically contains about 0.5-5 wt. % water based on the total weight of the moist pulverous material. However, in one example the moist pulverous material contains about 1-2 wt. % water based on the total weight of the moist pulverous material.

In another embodiment, the moist pulverous material additionally contains an alkaline material 38. Alkaline material 38 can be added to the particulate material separated from flue gas 12 by particle separator 24 in mixer 32 and combined with water. Alkaline material 38 can be any alkaline material, such as lime, limestone, calcium hydroxide and the like, and combinations thereof. Alkaline material 38 can be stored in a separate tank 40 and introduced to mixer 32 on a continuous or as-needed basis. The moist pulverous material having alkaline material 38 mixed therein typically contains 0.5-5 wt. % water based on the total weight of the moist pulverous material. In one example, the moist pulverous material contains about 1-2 wt. % water based on the total weight of the moist pulverous material.

In some systems, alkaline material 38 can be introduced to system 10 independently of the moist pulverous material. For example, alkaline material 38 can be directly introduced to boiler 20. In such an embodiment, alkaline material 38 is present in flue gas 12 when the moist pulverous material is introduced to the flue gas. In such a system, alkaline material 38 is not introduced into mixer 32.

Figure 2:
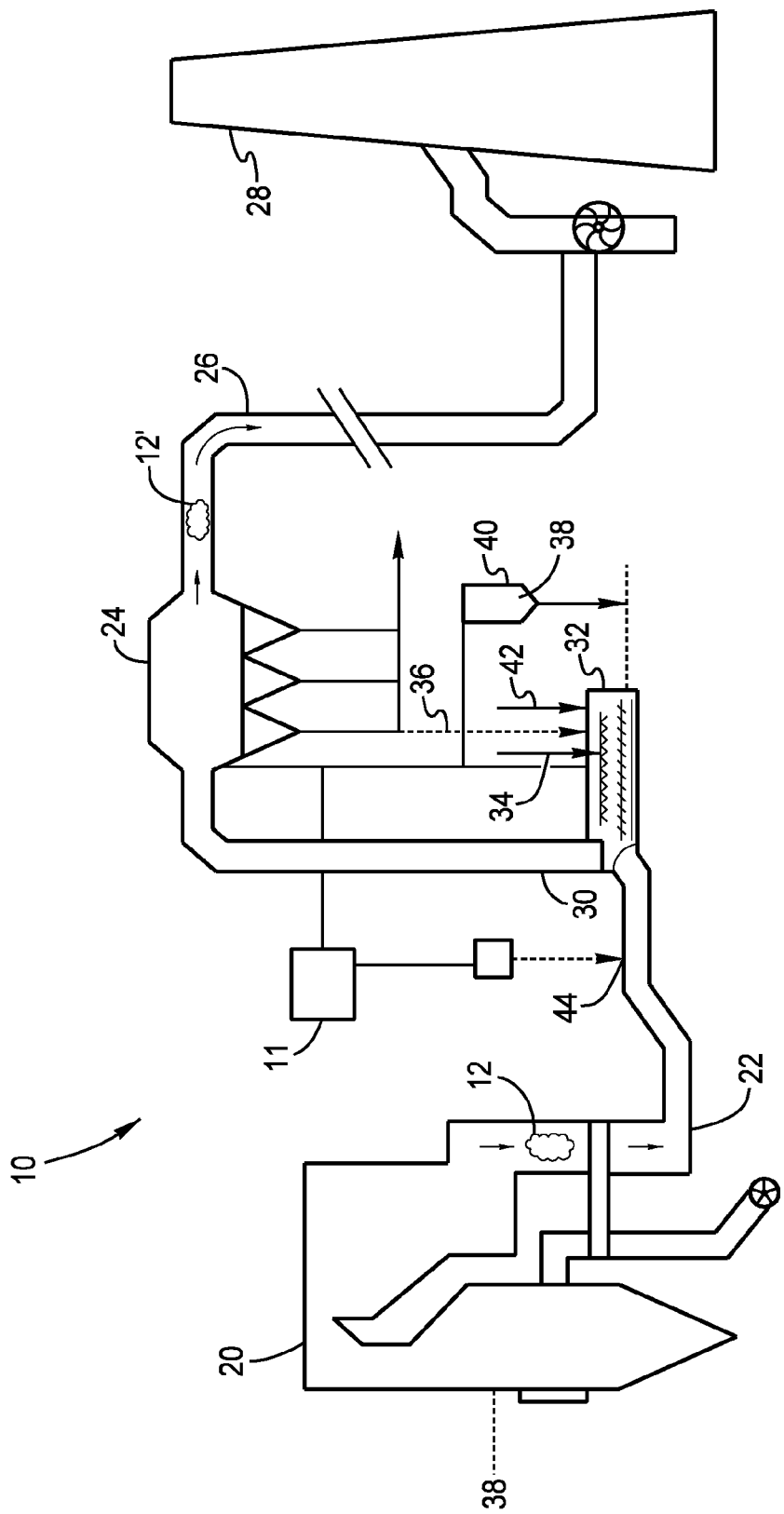
FIG. 2. is a schematic diagram of a system for reducing an amount of acid gases emitted by a flue gas, which is practiced using a DFGD system as known in the prior art.

The moist pulverous material is typically introduced to flue gas 12 via mixer 32 and subsequently facilitates the removal of contaminants from the flue gas. Contaminants that are removed from flue gas 12 include, but are not limited to, sulfur oxides. As shown in FIG. 2, to effect mercury removal from the flue gas, powdered activated carbon (PAC) is added to system 10.

Referring now to FIG. 2, PAC can be added to flue gas 12 through a variety of modules. In one embodiment, PAC can be added to the moist pulverous material made in mixer 32. PAC is added to mixer 32 via supply line 42. Any type of PAC, including PAC that is impregnated with a halogen or sulfur, can be utilized in the instant system.

Upon introduction of the moist pulverous material and PAC into vertical portion 30, the mercury present in flue gas 12 will interact, and react, with PAC and be separated from the flue gas upon collection of the PAC in particle separator 24. Typically, flue gas 12' has a mercury concentration of about 1 $\mu g/Nm^3$ or less.

Alternatively, PAC can be introduced into the flue gas at a point upstream of mixer 32, which is illustrated as point 44 in FIG. 2. In this embodiment, PAC is introduced to the flue gas independently of the moist pulverous material formed in mixer 32.

Still referring to FIG. 2, in either embodiment, PAC is introduced to the flue gas at an injection rate between about 0.5 and 10 lbs/MMacf.

Figure 3:
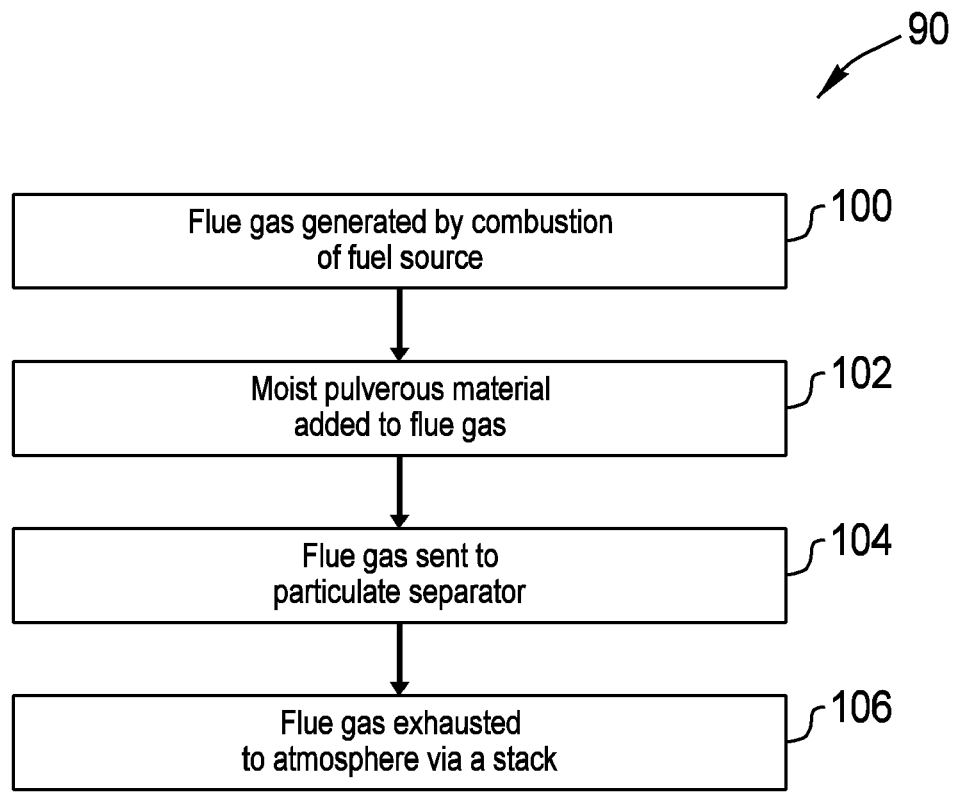
FIG. 3 illustrates a process stream of a flue gas generated by combustion of a fuel source as known in the prior art.

Referring now to FIG. 3, some embodiments include a method 90. At 100, flue gas 12 is generated by a boiler 20. Flue gas 12 is sent through system 10 via duct 22. Within system 10, as shown at 102, a moist pulverous material, as described above, is added to flue gas 12. The moist pulverous material effects the removal of contaminants, such as acid gases, from flue gas 12.

After the addition of the moist pulverous material, at 104, flue gas 12 travels to particulate separator 24, which removes particulates and other contaminants, from the flue gas thus forming a clean flue gas, flue gas 12'. Subsequently, at 106, flue gas 12' is exhausted to the atmosphere via stack 28.

Figure 4:
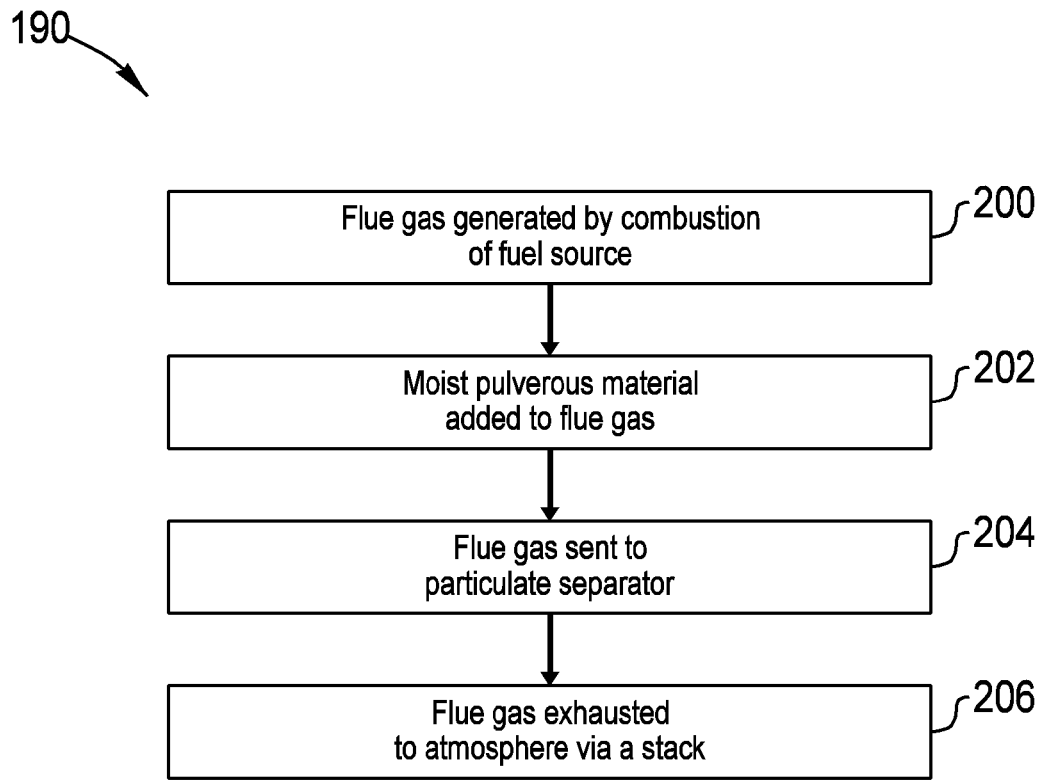
FIG. 4 illustrates a process stream of a flue gas generated by combustion of a fuel source.

To effect the removal of mercury from flue gas 12, in some embodiments, PAC is added to the flue gas. Referring now to FIG. 4, some embodiments include a method 190. After flue gas 12 is generated by combustion of a fuel source at 200, the flue gas travels via duct 22 to a vertical portion 30, which is in fluid communication with mixer 32. Mixer 32 facilitates the addition of the moist pulverous material and PAC to flue gas 12 at 202. Subsequently, and similarly to the process illustrated in FIG. 3, flue gas travels to particulate separator 24 at 204. After passing through particulate 24, flue gas 12 is cleansed, and is exhausted to the atmosphere via stack 28 at 206.

Figure 5:
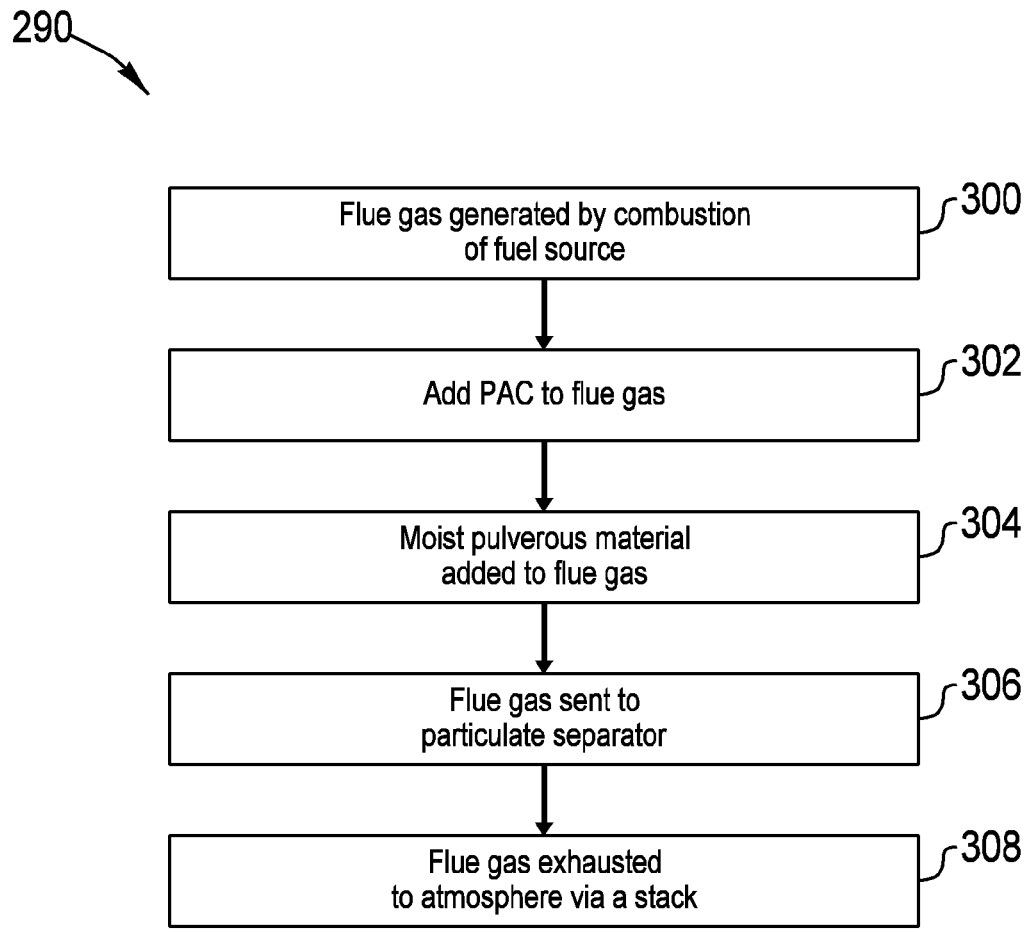
FIG. 5 illustrates a process stream of a flue gas generated by combustion of a fuel source.

Now referring to FIG. 5, which also illustrates the addition of PAC to the flue gas, some embodiments include a method 290. At 300, flue gas 12 is generated by combustion of a fuel source and travels through system 10 by passing through duct 22. At 302, PAC is added to flue gas 12 while it travels through duct 22. Subsequent to the addition of PAC, at 304, moist pulverous material is added to flue gas 12. Flue gas 12 travels to particulate separator at 306, which removes particulates and other contaminants therefrom, thereby forming clean flue gas 12', which at 308, is exhausted to an atmosphere via stack 28.

Although the subject matter has been described and illustrated with respect to exemplary embodiments thereof, it should be understood by those skilled in the art that the foregoing and various other changes, omissions and additions may be made therein and thereto, without parting from the spirit and scope of the disclosed method and system. Accordingly, other embodiments are within the scope of the following claims.

What is claimed is:

1. A system for reducing an amount of mercury discharged to an environment in a flue gas generated by combustion of a fuel source, said system comprising:
    a mixer adapted to form a moist pulverous material effective to remove contaminants from said flue gas, wherein said mixer facilitates the introduction of said moist pulverous material to said flue gas;
    a particle separator downstream of said mixer; and
    means for introducing powdered activated carbon (PAC) to said flue gas upstream of said particle separator in an amount between about 0.5 lbs/MMacf and 10 lbs/MMacf to remove at least a portion of mercury containing compounds from said flue gas, thereby reducing an amount of mercury discharged to an environment.

2. The system of claim 1, wherein said PAC comprises at least one compound selected from a halogen, sulfur, and combinations thereof.

3. The system of claim 1, wherein said moist pulverous material includes:
    a mixture of: water; particulate material removed from said flue gas by said particle separator; and at least one alkaline material selected from lime, limestone, calcium hydroxide, and combinations thereof.

4. The system of claim 1, wherein said moist pulverous material includes:
    a mixture of: water; and particulate material removed from said flue gas by said particle separator.

5. The system of claim 1, wherein said PAC is introduced to said flue gas at a point upstream of said mixer.

6. The system of claim 1, wherein said PAC is introduced to said moist pulverous material in said mixer, wherein said PAC and said moist pulverous material are subsequently introduced to said flue gas.

7. A system for reducing an amount of mercury discharged to an environment in a flue gas generated by combustion of a fuel source, said system comprising:
    a contact module for contacting flue gas with a moist pulverous material, wherein said moist pulverous material facilitates the removal of acid gases from said flue gas;
    a PAC module for mixing powdered activated carbon (PAC) in an amount between about 0.5 lb/MMacf and 10 lbs/MMacf with said flue gas, wherein said PAC interacts with at least a portion of mercury containing compounds in said flue gas; and
    a separation module for separating said mercury containing compounds from said flue gas containing said moist pulverous material and PAC, thereby reducing an amount of mercury in said flue gas.

* * * * *